(12) United States Patent
Hampapur et al.

(10) Patent No.: US 9,251,277 B2
(45) Date of Patent: *Feb. 2, 2016

(54) MINING TRAJECTORY FOR SPATIAL TEMPORAL ANALYTICS

(71) Applicant: International Business Machines Corporation, Armonk, NY (US)

(72) Inventors: Arun Hampapur, Norwalk, CT (US); Qing He, Ossining, NY (US); Xuan Liu, Yorktown Heights, NY (US); Songhua Xing, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 13/800,928

(22) Filed: Mar. 13, 2013

(65) Prior Publication Data

US 2014/0164389 A1 Jun. 12, 2014

Related U.S. Application Data

(60) Provisional application No. 61/734,453, filed on Dec. 7, 2012.

(51) Int. Cl.
*G06F 17/30* (2006.01)

(52) U.S. Cl.
CPC ...... *G06F 17/3087* (2013.01); *G06F 17/30241* (2013.01)

(58) Field of Classification Search
CPC .......... G06F 17/30241; G06F 17/3087; G06K 9/00785
See application file for complete search history.

(56) References Cited

U.S. PATENT DOCUMENTS

| | | | |
|---|---|---|---|
| 6,865,441 B2 | 3/2005 | Chandhoke | |
| 2009/0216775 A1 | 8/2009 | Ratliff et al. | |
| 2011/0208426 A1* | 8/2011 | Zheng et al. | 701/208 |
| 2012/0089920 A1 | 4/2012 | Eick | |
| 2012/0170802 A1* | 7/2012 | Millar et al. | 382/103 |
| 2012/0271748 A1 | 10/2012 | DiSalvo | |
| 2012/0275677 A1 | 11/2012 | Bower et al. | |
| 2012/0278313 A1 | 11/2012 | Gonzalez et al. | |
| 2012/0283948 A1* | 11/2012 | Demiryurek et al. | 701/533 |

OTHER PUBLICATIONS

Juhlin, "Mobile Application Analytics = specification for an online analytics tool," MSc Programmes in Engineering, Division of Engineering Psychology Lulea University of Technology, 2010, pp. 1-118.
J.-G Lee, et al., "Mining Discriminative Patterns for Classifying Trajectories on Road Networks," TKDE 23(5): 2011, pp. 713-726.

(Continued)

*Primary Examiner* — Dinku Gebresenbet
(74) *Attorney, Agent, or Firm* — Cantor Colburn LLP; Janice Kwon

(57) ABSTRACT

A method is provided to generate a heat map to show traffic congestion based on transit points. The method includes generating, by a processing device, a trajectory database from time-stamped global positioning system (GPS) sample points, and computing transit points for each trajectory in the trajectory database. The method further includes constructing a temporal transit graph. The transit graph captures the shortest paths among the transit points. The method further includes indexing and storing the transit graph in a spatial-temporal database for online analytic processing.

12 Claims, 7 Drawing Sheets

(56) References Cited

OTHER PUBLICATIONS

MoveMine, [online]; [retrieved on Mar. 13, 2013]; retrieved from the Internet http://dm.cs.uiuc.edu/movemine/static_html/intro.html Move Mine, "MoveMine: Mingin Moving Object Databases," 2010, pp. 1-5.

Seek, [online]; [retrieved on Mar. 13, 2013]; retrieved from the Internet http://www.seek-project.eu/ Seek, "Seek: SEmantic Enrichment of Trajectory Knowledge Discovery," 2013, pp. 1-2.

Li et al., "Clustering Moving Objects," Proc. ACM KDD, 2004, pp. 1-6.

Andrienko et al., "Interactive Visual Clustering of Large Collections of Trajectories," IEEE Symposium on Visual Analytics Science and Technology Oct. 12-13, Atlantic City, New Jersey, USA 2009, pp. 1-8.

Z. Chen, et al.,"Discovering popular routes from trajectories," ICDE, 2011: pp. 900-911.

D•Auria et al., "Time-focused density-based clustering of trajectories of moving objects," Journal of Intelligent Information Systems, 27(3):267{289), 2006, pp. 1-14.

F. Giannotti, et al.,"Trajectory pattern mining," SIGKDD, 2007, pp. 330-339.

J.-G. Lee, et al.,"Trajectory clustering: A partition-and-group framework," SIGMOD, 2007, pp. 593-604.

J.-G. Lee, et al., "Traclass: trajectory classification using hierarchical region-based and trajectory-based clustering," PVLDB, vol. 1, No. 1, pp. 1081-1094, 2008.

X. Li, et al., "Traffic density-based discovery of hot routes in road networks," SSTD, 2007, pp. 441-459.

H. Liu, et al., "Route Discovery from Mining Uncertain Trajectories," ICDM Workshops 2011: 1239-1242.

Microsoft, [online]; [retrieved on Mar. 13, 2013]; retrieved from the Internet http://research.microsoft.com/en-us/projects/tdrive/ Microsoft Research, "T-Drive: Driving Directions based on Taxi Traces," 2013, pp. 1-2.

Y. Zheng, et al, "Mining interesting locations and travel sequences from GPS trajectories," WWW, Track: User Interfaces and Mobile Web/ Session: Mobile Web, 2009: pp. 791-800.

\* cited by examiner

MINING TRAJECTORY FOR SPATIAL TEMPORAL ANALYTICS

CROSS REFERENCE TO RELATED APPLICATION

This is a Non-Provisional Application of U.S. Patent Provisional Application Ser. No. 61/734,453, filed Dec. 7, 2012, entitled, "Mining Trajectory for Spatial Temporal Analytics", the entirety of which is hereby incorporated herein by reference.

BACKGROUND

The present invention relates generally to traffic management, and more specifically, to generating a trajectory heat map at an aggregated level using computed transit points.

Technological advances in contemporary remote sensors, sensor networks, and location sensing devices have resulted in a tremendous amount of data about moving objects and motivated research in mining trajectory databases. Typically, the study of mining trajectory databases aims to provide informative and comprehensive analytics from a large collection of time stamped global positioning system (GPS) points (i.e., trajectory points), which can be applied to various use cases, such as traffic management, practical navigation solutions, public safety, and tourism applications.

BRIEF SUMMARY

According to an embodiment of the present invention, a method for generating a trajectory heat map at an aggregated level using computed transit points is provided. The method includes generating, by a processing device, a trajectory database from time-stamped global positioning system (GPS) sample points. According to exemplary embodiments, transit points are computed for each trajectory in the trajectory database. A temporal transit graph is constructed from the transit points. The transit graph of embodiments captures the shortest paths among these transit points. The transit graph is then indexed and stored in a spatial-temporal database for online analytic processing.

According to another embodiment of the present invention, a system for generating a trajectory heat map at an aggregated level using computed transit points is provided. The system includes a computer processor and logic executable by the computer processor. The logic is configured to implement a method. The method includes generating, by a processing device, a trajectory database from time-stamped global positioning system (GPS) sample points. According to exemplary embodiments, transit points are computed for each trajectory in the trajectory database. A temporal transit graph is constructed from the transit points. The transit graph of embodiments captures the shortest paths among these transit points. The transit graph is then indexed and stored in a spatial-temporal database for online analytic processing.

According to a further embodiment of the present invention, a computer program product for generating a trajectory heat map at an aggregated level using computed transit points is provided. The computer program product includes a storage medium having computer-readable program code embodied thereon, which when executed by a computer processor, causes the computer processor to implement a method. The method includes generating, by a processing device, a trajectory database from time-stamped global positioning system (GPS) sample points. According to exemplary embodiments, transit points are computed for each trajectory in the trajectory database. A temporal transit graph is constructed from the transit points. The transit graph of embodiments captures the shortest paths among these transit points. The transit graph is then indexed and stored in a spatial-temporal database for online analytic processing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein are directed to generating a trajectory heat map at an aggregated level using computed transit points. Embodiments generate a trajectory database from time-stamped global positioning system (GPS) sample points. Transit points are computed for each trajectory in the trajectory database. A temporal transit graph is constructed using the computed transit points, whereby the transit graph captures the shortest paths between the transit points. The transit graph is then indexed and stored in a spatial-temporal database for online analytic processing according to disclosed embodiments.

Embodiments disclosed herein generate a transit graph (i.e., trajectory heat map) based on critical trajectory points (i.e., transit points). Accordingly, embodiments provide a scalable and efficient trajectory mining prototype system to generate the trajectory heat map at aggregated level for the online spatial-temporal analytics. Embodiments focus on transit points, which represent a small subset of the trajectory points, take into account trajectory modeling to all trajectories with network segments, and then compute a smaller subset of transit points from global positioning system (GPS) trajectory data. The transit points are then used to construct a transit graph that is indexed and stored for on-line analytic processing according to embodiments.

Contemporary methods of generating heat maps for traffic do not scale well and are not compatible with online analytics. Contemporary solutions include trajectory clustering and hot route discovery. However, these solutions only generate a few (hot or clustered) routes, rather than an aggregated overview of the overall pattern. In addition, these contemporary solutions do not include the integration with on-line spatial-temporal analytics.

To understand the pattern of all participating moving objects, embodiments disclosed herein generate a trajectory heat map at an aggregated level to enable on-line spatial temporal analytics. Embodiments generate the heat map to show the overall trajectory pattern, rather than only a few hot routes or clustered trajectories. Additionally, embodiments discover a small set of trajectory points, which are critical to the moving pattern, thus improving scalability and mining performance. Furthermore, the mining method of embodiments is seamlessly integrated with the on-line spatial temporal analytics.

Figure 1:
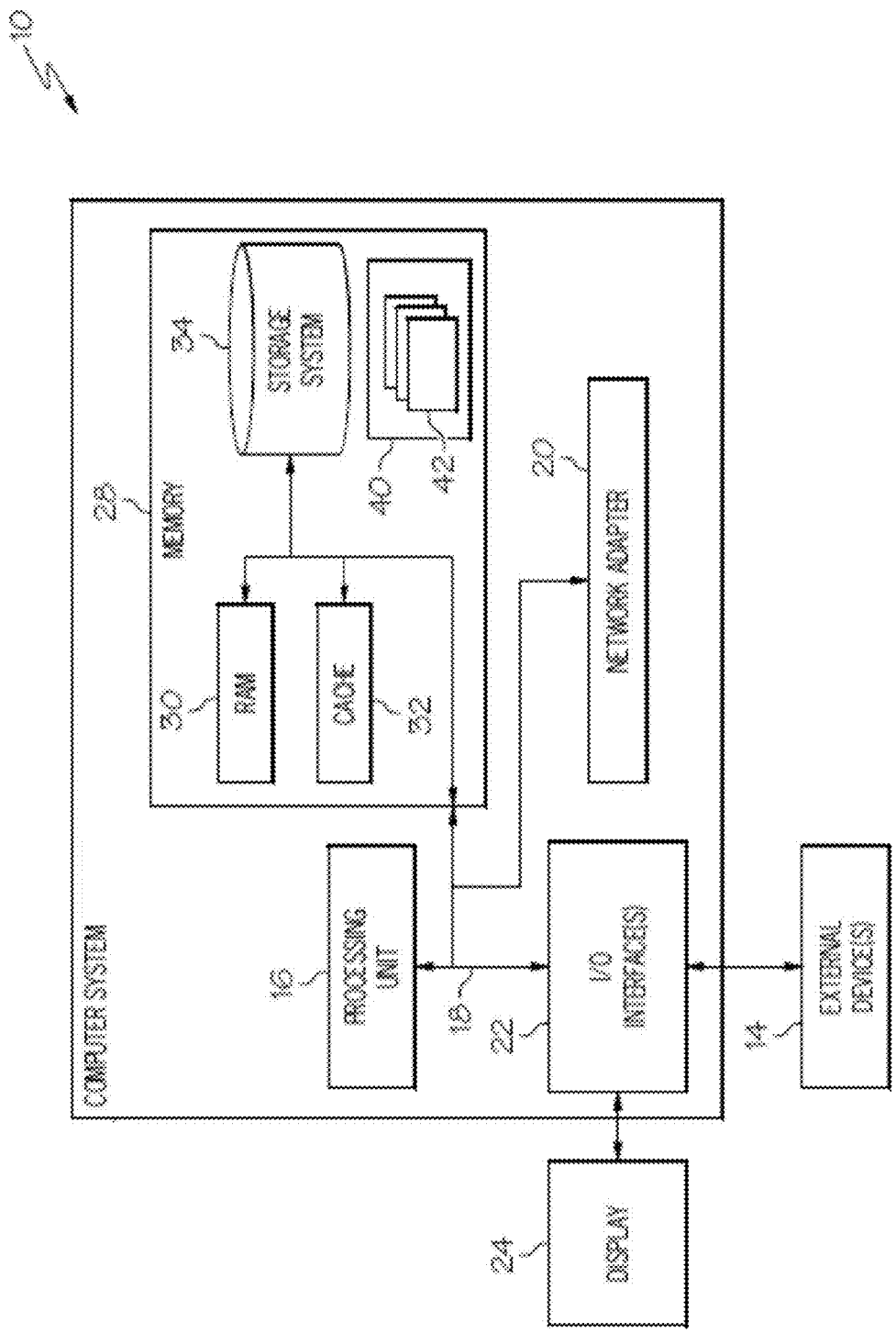
FIG. 1 depicts a block diagram of a computer system according to an embodiment.

Referring now to FIG. 1, a block diagram of a computer system 10 suitable for generating a trajectory heat map at an aggregated level using computed transit points according to exemplary embodiments is generally shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
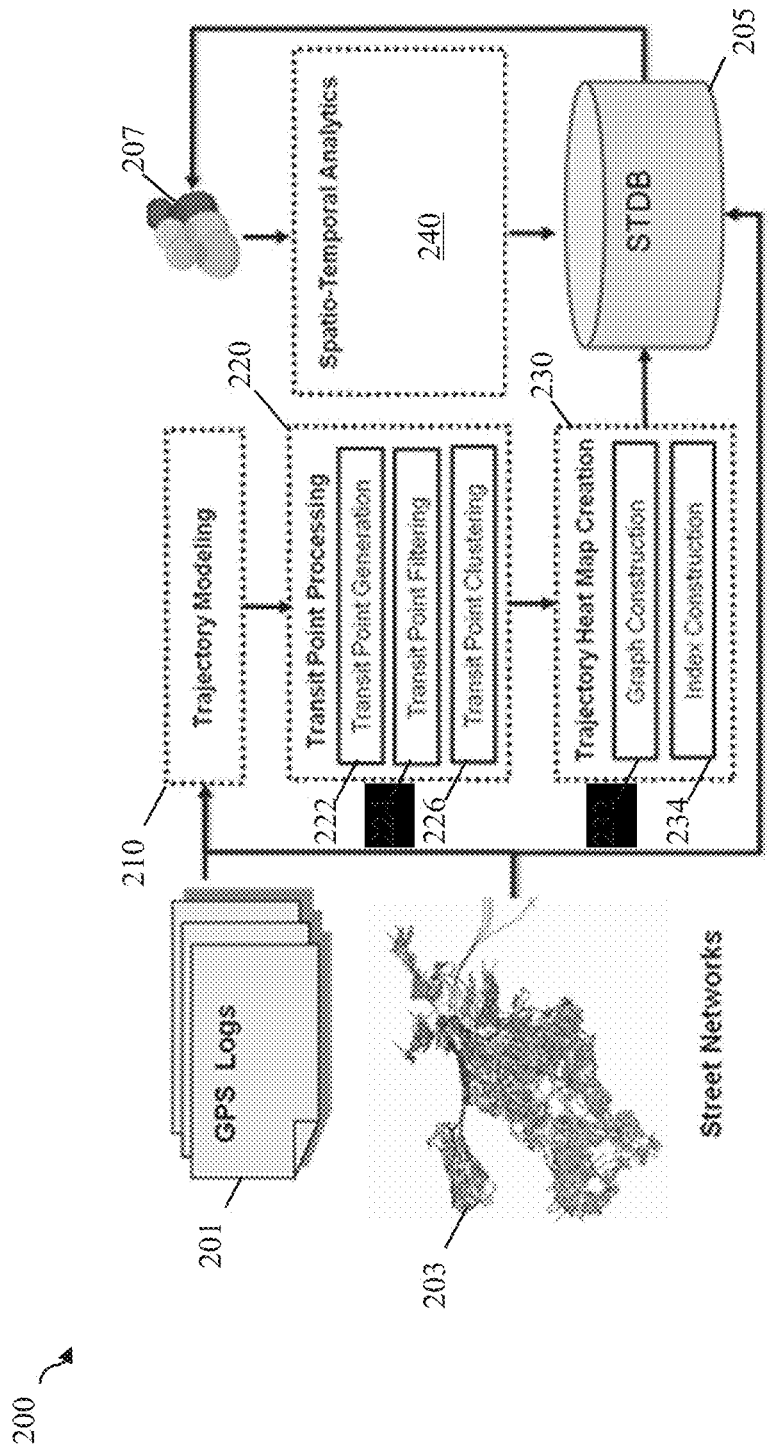
FIG. 2 depicts a process for generating a trajectory heat map at an aggregated level using computed transit points according to an embodiment.

With reference to FIG. 2, a process 200 performed by an embodiment of the processing device 16 of computer system 10 is generally shown. As shown in FIG. 2, the process 200 generates a trajectory heat map at an aggregated level using computed transit points according to an embodiment.

A trajectory modeling module 210 generates a trajectory model data set from global positioning system (GPS) sample points. According to an embodiment, the GPS points that are collected from GPS logs 201 for various vehicles in a street network table 203 may be converted into polylines and stored in a trajectory database. A trajectory of an embodiment may be defined as a sequence of GPS sampling points with a sampling interval less than a certain threshold (e.g., 20 minutes) for each vehicle.

The trajectory modeling module 210 of an embodiment further includes the processes of data clean up, stay point detection, street network alignment and temporal interpolation. According to an embodiment, the data clean up may detect and remove corrupted GPS records due to a GPS signaling problem from the collected raw data. The corrupted GPS points may be removed using a speed test, whereby if the speed of any given trajectory segment is larger than a certain threshold (e.g., 120 mph) it will be considered a GPS error. An embodiment models the end points of each trajectory using stay points. Stay point detection may be required, because an embodiment may not want to count the elapsed time when a vehicle remains stationary.

Figure 3B:
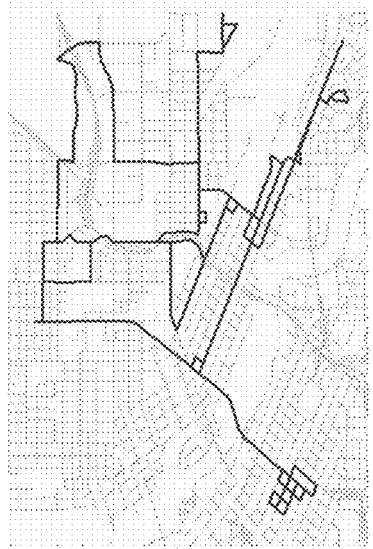
FIG. 3B depicts a trajectory modeling aligned with road networks according an embodiment.
Figure 3A:
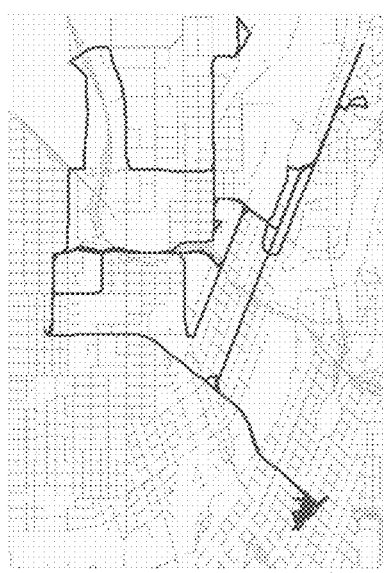
FIG. 3A depicts a trajectory modeling according the related art.

Next, unlike the contemporary art, which simply treat the routes between trajectory points as straight lines, as shown in FIG. 3A, an embodiment aligns these trajectory points onto the street network segments, as shown in FIG. 3B. According to an embodiment, trajectory alignment with road networks may capture the actual route that vehicles take and may find the common routes of two vehicles whose GPS sampling intervals are different. Because the GPS data of an embodiment has a very high sampling rate (i.e., most sampling intervals are less than 30 seconds), using the street network segments to represent actual trajectory may reach a very high accuracy.

In the rare case where two consecutive GPS points do not locate on the same or adjacent road segments, an embodiment may connect them by the shortest path. Because the original trajectory points have been aligned to the street network segments according to an embodiment, a time stamp for the newly adjusted trajectory points may be slightly different and resolved using temporal interpolation according to an embodiment. Accordingly, the discovery of possible common routes (i.e., sub-trajectories) between different trajectories will be a straight forward process as further discussed below regardless of the sampling rate.

According to an embodiment, the trajectory modeling module 210 receives the GPS logs 201 and the street network table 203 as input, and outputs a spatial GPS point table and a spatial trajectory polyline table. The trajectory modeling module 210 of an embodiment may be processed offline and may be scheduled on a daily basis.

The transit point processing module 220 captures a moving pattern for each trajectory in the trajectory database using transit points. After creating the aligned trajectories, as described above with respect to the trajectory modeling module 210, a transit point processing module 220 of an embodiment computes all the transit points 410 for the aligned trajectory data set, studies the distribution of the transit points 410, and observes which transit points 410 are clustered in particular network locations to construct a trajectory graph 400, as shown in FIG. 4.

Figure 4:
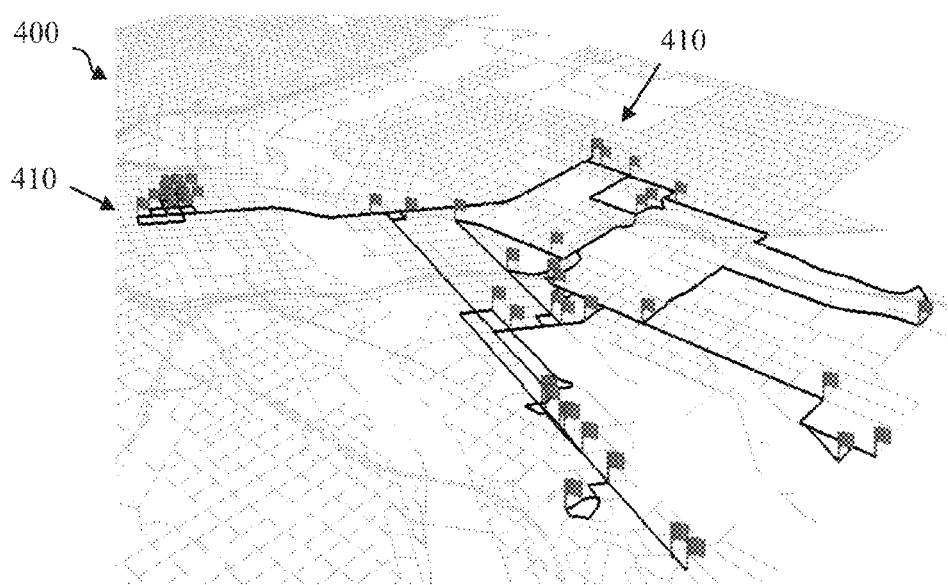
FIG. 4 depicts an aligned trajectory model marked with transit points according to an embodiment.

FIG. 4 depicts an aligned trajectory marked with transit points 410. An embodiment selects these network locations as the nodes for creating a transit graph (i.e., trajectory heat map) as discussed below with respect to the trajectory heat map creation module 230. According to an embodiment, the centroids of the clusters of transit points 410 form the nodes. An embodiment may create a known Voronoi diagram of the centroids of the clustered transit points 410 for the online creation of the trajectory heat map. The actual trajectory segments between two nodes are clustered to form an edge between these two nodes according to an embodiment.

Figure 5:
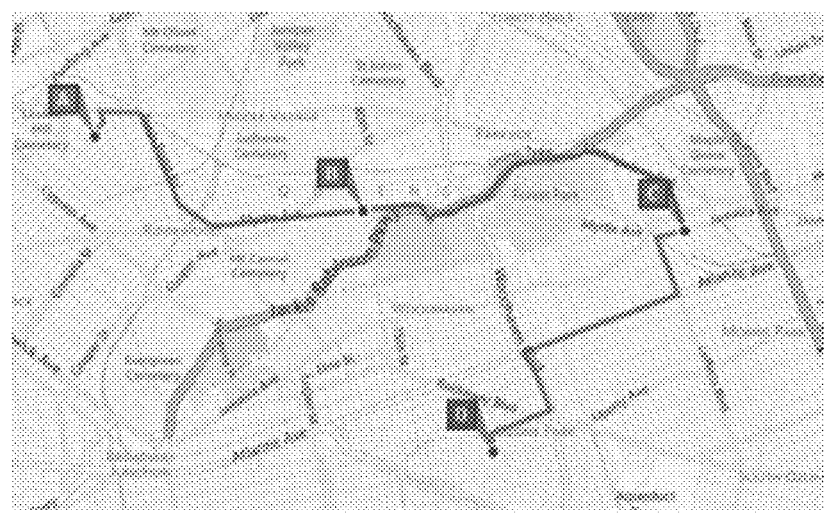
FIG. 5 depicts transit points of a given trajectory according to an embodiment.

In order to analyze the trajectory patterns, an embodiment divides an arbitrary trajectory into a number of sub-trajectories, whereby the transit points are the endpoints of all the shortest sub-trajectories. Although each arbitrary trajectory is not necessarily the shortest path between the origin s and the destination d, according to an embodiment the trajectory can be divided into a number of sub-trajectories, each of which is the exact shortest path from the corresponding origin $s_i$ to the destination $d_i$. As demonstrated in FIG. 5, the non-shortest trajectory from A to D has been partitioned into three shortest sub-trajectories: A-B, B-C and C-D. Hence A, B, C and D are transit points. A specific embodiment keeps the number of transit points for any trajectory to a minimum. Therefore, modeling trajectories with transit points can greatly enhance the scalability because an embodiment only needs to deal with a small fraction of the original dataset, thus avoiding performing computationally expensive operations (e.g., clustering, sequence processing) on all trajectory points. Moreover, as all sub-trajectories are the exact shortest paths each transit point, an embodiment can reconstruct them very fast by using a known A* algorithm or store them with efficient data structure (e.g., path oracles).

In greater detail, an embodiment may define a transit point as follows: Given a trajectory T, whose location sequence is $S(T)=\{p_1, p_2, \ldots, p_N\}$, and a road network R, the transit points sequence of T is a minimum set of points $S_{tr}(T)=\{q_1, q_2, \ldots, q_M\}$, where $q_i \in S(T)$, $\forall i \in \{1, \ldots, M\}$ and the location sequence of subtrajectory of T: $S(T_{sub})=\{p_j, p_{j+1}, \ldots, p_K\}$ (where $p_j=p_K=q_{i+1}$ $\forall i \in \{1, \ldots, M-1\}$) is the shortest path on R from $p_j$ to $p_K$. An embodiment calls $q_i \in S_{tr}(T)$, $\forall i \in \{1, \ldots, M\}$ a transit point of T.

Turning back to FIG. 2, the transit point processing module 220 may include a transit point generation module 222, a transit point filtering module 224, and transit point clustering module 226.

A transit point generation module 222 may apply the Dijkstra style expansion to compute the transit points of a trajectory T. More specifically, for each trajectory point p on T, a transit point generation module 222 of an embodiment may use the Dijkstra algorithm to compute the shortest path from the origin s to p and compare with the actual sub-trajectory in T from s to p. Assume $p_i$ is the first point, where the shortest path from s to $p_i$ differs from its sub-trajectory, an embodiment adds the $p_i-1$ to the transit point list and re-invoke the Dijkstra expansion starting from $p_i-1$. This algorithm terminates when the destination point t of T has been visited and t is added as the last transit point. Note that, because the optimality of Dijkstra algorithm guarantees that the closer node must be visited earlier, the transit point generation module 222 of an embodiment only needs to run the Dijkstra's algorithm once until a new transit point is detected. During the computation of all transit points of all trajectories, the transit point generation module 222 of an embodiment caches all the shortest paths computed so far. This caching can significantly save the entire running time, as the trajectories have substantial overlapping portions (i.e., sub-trajectories).

The transit point clustering module 226 of an embodiment analyzes the distribution of the transit points and observes that these transit points cluster at particular network locations. The transit point filtering module 224 of an embodiment identifies these network locations (termed hot transit nodes) and filters out other transit points, Network nodes containing hot transit nodes may carry certain semantic meanings (e.g., locations of points of interest), which result in trajectories deviating from their original shortest paths. Because these hot transit nodes capture most of the vehicle movements, the transit point clustering module 226 of an embodiment only considers the hot transit nodes for the subsequent processes. Next, the transit point clustering module 226 of an embodiment clusters these hot transit nodes into a number of disjoint geospatial regions using a known density based clustering method. The centroid of each clustered region (i.e., a transit cluster) may be considered as a node in the trajectory heat map according to an embodiment. This clustering helps get an aggregated result for better analysis and visualization.

The transit point processing module 220 of an embodiment may receive the spatial GPS point table and the spatial trajectory polyline table as input and may output three spatial tables including a point table for the nodes in the trajectory graph 400, a polyline table for the edges in the trajectory graph 400, and a polygon table for the Voronoi diagram of the trajectory graph nodes. The transit point processing module 220 of an embodiment may be processed offline.

The trajectory heat map creation module 230 of an embodiment constructs a transit graph (i.e., trajectory heat map). The trajectory heat map creation module 230 of an embodiment may include a graph construction module 232, which captures the shortest paths among the transit points, and an index construction module 234, which indexes and stores the transit graph in a spatial-temporal database (STDB) 205 to optimize the online spatial-temporal analytics module 240 of an embodiment.

According to an embodiment, the graph construction module 232 may construct a trajectory heat map online by querying qualifying trajectories with an input temporal range. For each trajectory, the edges of the trajectory graph 400 are classified using the Voronoi diagram of the nodes according to an embodiment. The trajectory graph 400 is then color coded based on the number of routes passed on each edge of the trajectory graph 400 to generate a trajectory heat map according to an embodiment.

In greater detail, the constructed transit graph of an embodiment may be a directed graph $G_T=(V_C, E)$, where $V_C$ is comprised of the centroids of all transit clusters. An edge $e \in E$ (termed transit edge) is preserved in $G_T$ from $p_C$ to $q_C$ ($p_C, q_C \in V$) if there exists a shortest sub-trajectory from p to q, where p and q belong to the clusters centered at $p_C$, $q_C$, respectively. The weight of e, w(e) represents the number of sub-trajectories passing from the cluster centered at $p_C$ to the cluster centered at $q_C$ in any given temporal range, which is query dependent. To compute the connectivity among all transit clusters, the graph construction module 232 of an embodiment scans each trajectory computed by the trajectory modeling module 210 for two consecutive transit points (which do not necessarily belong to the same trajectory) to form a transit edge. In this embodiment, where the transit point does not belong to any transit cluster due to transit point filtering, the graph construction module 232 may simply drop the corresponding sub-trajectories.

Figure 6A:
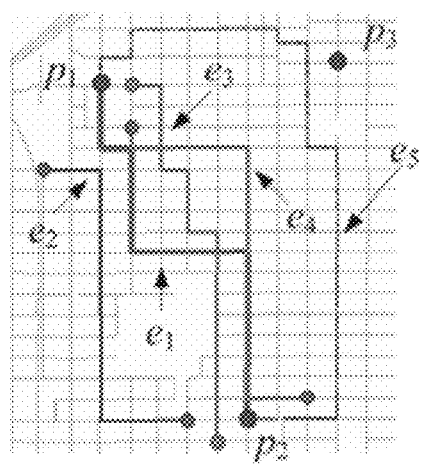
FIG. 6A depicts a transit edge used to represent a number of shortest sub-trajectories according to an embodiment.
Figure 6B:
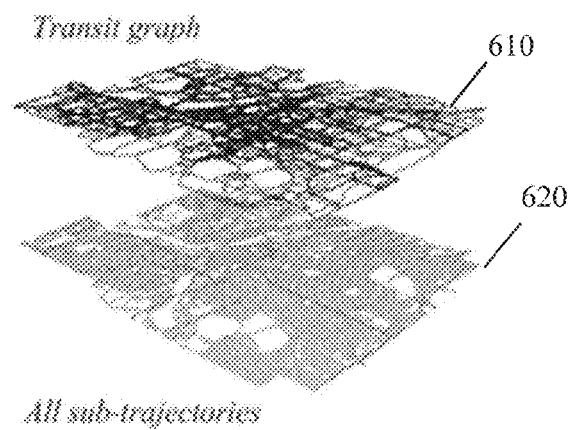
FIG. 6B depicts a transit graph as an abstraction of all participating sub-trajectories according to an embodiment.

An embodiment may use one transit edge to represent a number of shortest sub-trajectories as shown in FIG. 6A, where the transit edge $e_1$ between $p_1$ and $p_2$ represents sub-trajectories $e_2$, $e_3$, $e_4$. Because these sub-trajectories have end points close to $p_1$ and $p_2$, and are the shortest paths, they are very likely to be close to $e_1$. On the contrary, although the sub-trajectory $e_5$ has the exact end points as $e_1$, it cannot be represented by $e_1$ because it is not the shortest path and should be partitioned into two shortest sub-trajectories ($p_1$, $p_3$) and ($p_3$, $p_2$) respectively. FIG. 6B demonstrates that the transit graph 610 is an abstraction of all participating sub-trajectories 620.

Figure 7:
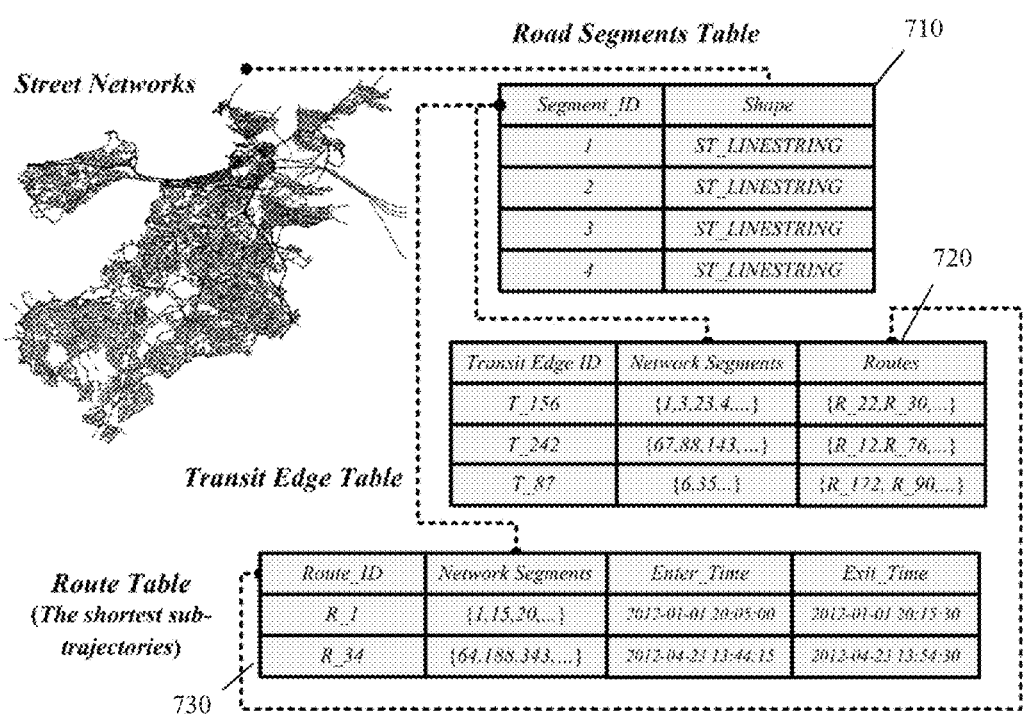
FIG. 7 depicts the index schema and the storage of the transit graph in a database according to an embodiment.

The index construction module 234 of an embodiment indexes and stores the generated transit graph in tables as generally shown in FIG. 7. Since the basic geometry components for transit edges and sub-trajectories are the street network segments, the index construction module 234 of an embodiment may only store them once in the road segments table 710 in the STDB 205.

The route table 730 stores all the shortest sub-trajectories along with their entering and exiting time stamps. The geometry shape of one sub-trajectory is comprised of a number of road segment IDs, which link to the road segments table 710. Similarly, one transit edge from the transit edge table 720 is associated with a number of shortest sub-trajectories as well as road segments. As a result, during the query time, the index construction module 234 of an embodiment can speedily retrieve the related sub-trajectories for any given transit edge from the transit edge table 720. According to an embodiment, the index construction module 234 may not store the weights for the transit edges because they are computed online with a user's inputs.

The trajectory heat map creation module 260 of an embodiment may receive the trajectory polyline table, the trajectory graph 400, and the Voronoi diagram of the nodes as input, and may output a table indicating the travel frequency on each edge within the given temporal range. The trajectory heat map creation module 260 of an embodiment may be processed online.

Referring to FIG. 2, a spatial-temporal analytics module 240 of an embodiment is provided to analyze the trajectory heat map graph with a user 207 query. The spatial-temporal analytics module 240 of an embodiment integrates the complete functionalities of a spatial-temporal analytics toolkit (STAT) with the trajectory heat map of an embodiment. In particular, the query engine of STAT performs complex geospatial/temporal tasks (e.g., queries, join operations) to generate intermediate results while the analytics engine of STAT has the capability to utilize built-in algorithms or third party software known to those of skill in the art to provide analytical insights to the query results.

Figure 8:
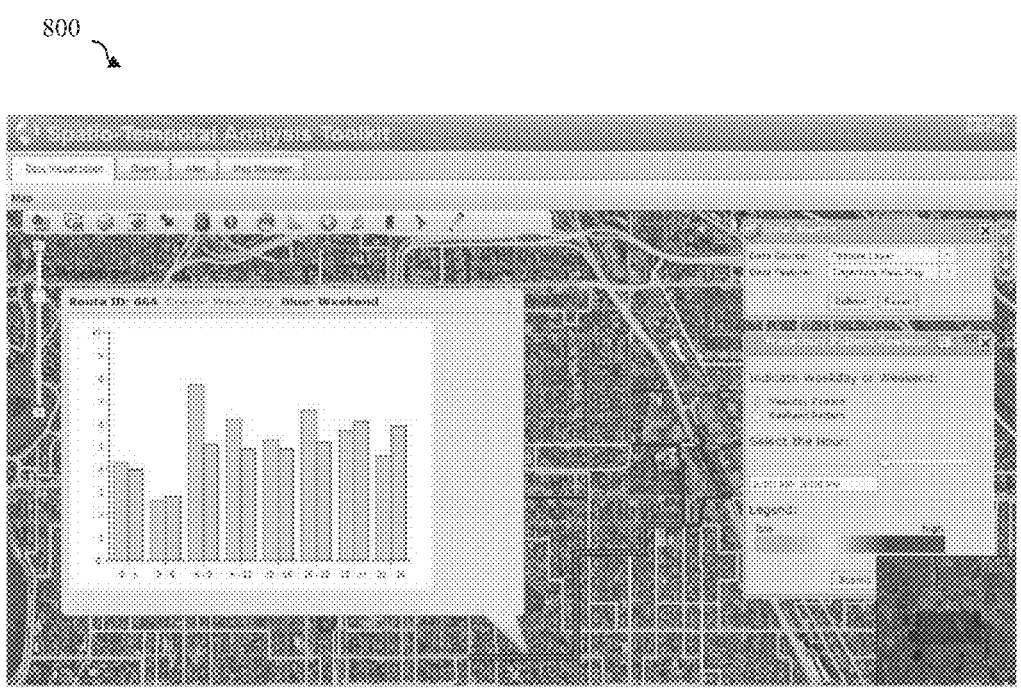
FIG. 8 depicts a user interface of a spatial-temporal analytics toolkit (STAT) according to an embodiment.

Referring to FIG. 8, an embodiment of a user interface 800 of the STAT is generally shown. According to an embodiment, a user 207 may formulate queries on the trajectory heat map using the user interface 800. Moreover, the user 207 may navigate the heat map using the user interface 800. For example, the user 207 may interact with a slider bar to see the changes of the trajectory heat map within the trajectory heat map temporal range. According to an embodiment, the user 207 may compare heat maps using the user interface 800. For example, the user 207 may generate and overlay multiple heat maps for different time ranges and may click on an edge to see how many sub-trajectories are associated to the transit edge and their exact geometry shapes.

The user interface 800 of an embodiment may be developed in JavaScript with Dojo toolkit. As shown in FIG. 8, the trajectory heat map has been pre-computed and loaded as a feature layer for the online spatial-temporal analytics according to an embodiment. By drawing a polygonal shape and specifying a temporal range, an embodiment may visualize the trajectory heat map within both spatial and temporal bounds. Moreover, the user can click on any transit edge to see how many sub-trajectories are associated to this transit edge and their exact geometry shapes. In addition, the user 207 may use a provided "Trajectory Pattern Analysis" widget of an embodiment to analyze trajectory patterns. As depicted in FIG. 8, the user 207 may drag a slider back and forth to see the hourly pattern over weekday or weekend for the entire transit graph. The widget of an embodiment also allows the user to select any transit edge to see the temporal distribution of sub-trajectories for this particular edge. To enable advanced analytics, the user 207 can load additional datasets to overlay on top of the trajectory heat map and perform comprehensive operations, such as spatial temporal joins.

Embodiments disclosed herein derive a trajectory heat map for valid spatial-temporal queries by analyzing and clustering transit points, thus capturing aggregated trajectory patterns. The trajectory heat map of embodiments is generated at an aggregated level rather than classifying and counting trajectories over each of the different segments. Embodiments disclosed herein aggregate the trajectories and use one abstracted route to represent all trajectories between points clustered between two end points. Embodiments also allow users to get trajectory distribution details by clicking on each abstracted route.

Technical effects and benefits of embodiments include increased scalability of data mining techniques due the transit points only represents a small fraction of the total trajectory points. In addition, according to embodiments, the routes between two transit points are the shortest paths, thus eliminating the need to store the same common routes over and over again. Transit points of embodiments also allow the trajectory heat map to be derived at an aggregated level for better analysis and visualization. Embodiments disclosed provide a method and system to speedily and accurately capture the trajectory patterns for spatial-temporal query and analysis and provide insightful analytical and visual results.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method, comprising:
   generating, by a processing device, a trajectory database from time-stamped global positioning system (GPS) sample points;
   computing transit points for each trajectory in the trajectory database, each transit point computed from a respective time-stamped GPS sample point, wherein computing the transit points includes computing a connectivity among all point transit clusters and clustering transit points located in similar network locations of the trajectory graph, whereby the centroids of transit point clusters form a node for the transit graph;
   grouping the transit points into individual transit clusters, and constructing a temporal transit graph based on the transit clusters to define an aggregated trajectory of traffic patterns, the transit graph capturing the shortest paths among the transit points;
   determining a common route of at least two vehicles whose GPS sampling intervals are different based on performing a trajectory alignment of the transit points with respect to a road network;
   when two consecutive GPS points do not locate on the same or adjacent road segments, connecting the consecutive GPS points by the shortest path and performing a temporal interpolation to generate modified time stamps corresponding to the connected GPS points; and
   indexing and storing the transit graph in a spatial-temporal database for online analytic processing, the online analytic processing comprising receiving spatial-temporal queries on the transit graph via a user interface,
   wherein the GPS sample points that are collected from GPS logs of a plurality of vehicles in a street network table to define traffic patterns.

2. The computer-implemented method of claim 1, wherein the transit points divide each trajectory into a number of sub-trajectories, each sub-trajectory being an exact shortest path between each transit point.

3. The computer-implemented method of claim 1, wherein the generating of the trajectory database further comprises:
   removing corrupted GPS sample points; and
   aligning qualified GPS sample points to a road network.

4. The computer-implemented method of claim 1, wherein the constructing of the temporal transit graph further comprises:
   color coding the transit graph based on a number of routes passed on each transit edge of the transit graph.

5. The computer-implemented method of claim 1, wherein the online analytic processing comprises receiving spatial-temporal queries on the transit graph via a user interface.

6. The computer-implemented method of claim 1, wherein the temporal transit graph is constructed offline and the online analytics processing occurs online.

7. A computer program product, comprising:
   a computer readable storage medium having program code embodied therewith, the program code executable by a processing device for:
   generating, by the processing device, a trajectory database from time-stamped global positioning system (GPS) sample points;
   computing transit points for each trajectory in the trajectory database, each transit point computed from a respective time-stamped GPS sample point, wherein computing the transit points includes computing a connectivity among all point transit clusters and clustering transit points located in similar network locations of the trajectory graph, whereby the centroids of transit point clusters form a node for the transit graph;
   grouping the transit points into individual transit clusters, and constructing a temporal transit graph based on the transit clusters to define an aggregated trajectory of traffic patterns, the transit graph capturing the shortest paths among the transit points;
   determining a common route of at least two vehicles whose GPS sampling intervals are different based on performing a trajectory alignment of the transit points with respect to a road network;
   when two consecutive GPS points do not locate on the same or adjacent road segments, connecting the consecutive GPS points by the shortest path and performing a temporal interpolation to generate modified time stamps corresponding to the connected GPS points; and
   indexing and storing the transit graph in a spatial-temporal database for online analytic processing, the online analytic processing comprising receiving spatial-temporal queries on the transit graph via a user interface,
   wherein the GPS sample points that are collected from GPS logs of a plurality vehicles in a street network table define the traffic patterns.

8. The computer program product of claim 7, wherein the transit points divide each trajectory into a number of sub-trajectories, each sub-trajectory being an exact shortest path between each transit point.

9. The computer program product of claim 7, wherein the generating of the trajectory database further comprises:

removing corrupted GPS sample points; and aligning qualified GPS sample points to a road network.

10. The computer program product of claim 7, wherein the constructing of the temporal transit graph further comprises:

computing a connectivity among all point transit clusters; and color coding the transit graph based on a number of routes passed on each transit edge of the transit graph.

11. The computer program product of claim 7, wherein the online analytic processing comprises receiving spatial-temporal queries on the transit graph via a user interface.

12. The computer program product of claim 7, wherein the temporal transit graph is constructed offline and the online analytics processing occurs online.

* * * * *